(12) United States Patent
Gibson et al.

(10) Patent No.: US 8,109,083 B2
(45) Date of Patent: Feb. 7, 2012

(54) ASPIRATOR SUPPORT STRUCTURE

(75) Inventors: Donald A. Gibson, Stoughton, WI (US); Phaneendra Chinta, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 765 days.

(21) Appl. No.: 12/234,165

(22) Filed: Sep. 19, 2008

(65) Prior Publication Data

US 2009/0113882 A1 May 7, 2009

Related U.S. Application Data

(60) Provisional application No. 60/985,321, filed on Nov. 5, 2007.

(51) Int. Cl.
*B26B 3/00* (2006.01)

(52) U.S. Cl. ................. 60/317; 60/319; 60/316

(58) Field of Classification Search .......... 60/304, 60/307, 308, 316, 317, 319
See application file for complete search history.

(56) References Cited

U.S. PATENT DOCUMENTS

| | | | | |
|---|---|---|---|---|
| 2,055,453 A * | 9/1936 | Horton | ........................ | 181/262 |
| 3,657,878 A * | 4/1972 | Kaufmann, Jr. | ............... | 60/308 |
| 3,973,916 A * | 8/1976 | Shelton | ........................ | 422/174 |
| 4,050,903 A * | 9/1977 | Bailey et al. | ................ | 422/177 |
| 4,051,671 A | 10/1977 | Brewer | | |
| 4,094,645 A * | 6/1978 | Bailey | ........................ | 422/180 |
| 4,361,206 A * | 11/1982 | Tsai | ........................... | 181/255 |
| 4,807,814 A | 2/1989 | Douche et al. | | |
| 4,872,528 A | 10/1989 | Goplen et al. | | |
| 5,396,767 A * | 3/1995 | Suzuki | ......................... | 60/298 |
| 6,540,046 B1 | 4/2003 | Schuhmacher et al. | | |
| 6,604,604 B1 | 8/2003 | Badeau et al. | | |
| 6,722,123 B2 | 4/2004 | Liu et al. | | |
| 7,174,992 B2 | 2/2007 | Kicinski | | |
| 7,382,572 B1 | 6/2008 | Turner et al. | | |
| 2005/0183704 A1* | 8/2005 | Usui | ........................ | 123/568.17 |
| 2006/0277901 A1* | 12/2006 | Allegre et al. | ................... | 60/317 |

OTHER PUBLICATIONS

Validation Studies of Fluent Turbulence Models for Fluent Simulations of AguaClara Flocculators AguaClara Computational Fluid Dynamics Spring 2010 Travis Stanislaus.*

* cited by examiner

*Primary Examiner* — Thomas Denion
*Assistant Examiner* — Patrick Maines
(74) *Attorney, Agent, or Firm* — Andrus, Sceales, Starke & Sawall, LLP

(57) ABSTRACT

An aspirator includes converging and diverging cones, and singular support tube structure concentrically surrounding and mounting both the converging cone and the diverging cone and maintaining predetermined axial spacing and alignment of the cones in a cost-effective manufacturing assembly.

2 Claims, 5 Drawing Sheets

ASPIRATOR SUPPORT STRUCTURE

CROSS-REFERENCE TO RELATED APPLICATIONS

This application claims the benefit of and priority from provisional U.S. Patent Application No. 60/985,321, filed Nov. 5, 2007, incorporated herein by reference.

BACKGROUND AND SUMMARY

The invention relates to aspirators, and more particularly to simple and efficient support structure for same.

Aspirators are known in the prior art. A converging cone accelerates a primary flow therethrough to create Venturi effect vacuum which aspirates secondary flow combining with the primary flow and flowing through a diverging cone downstream of the converging cone and expanding and decelerating flow therethrough.

The present invention arose during continuing development efforts directed toward the above technology.

DETAILED DESCRIPTION

Figure 1:
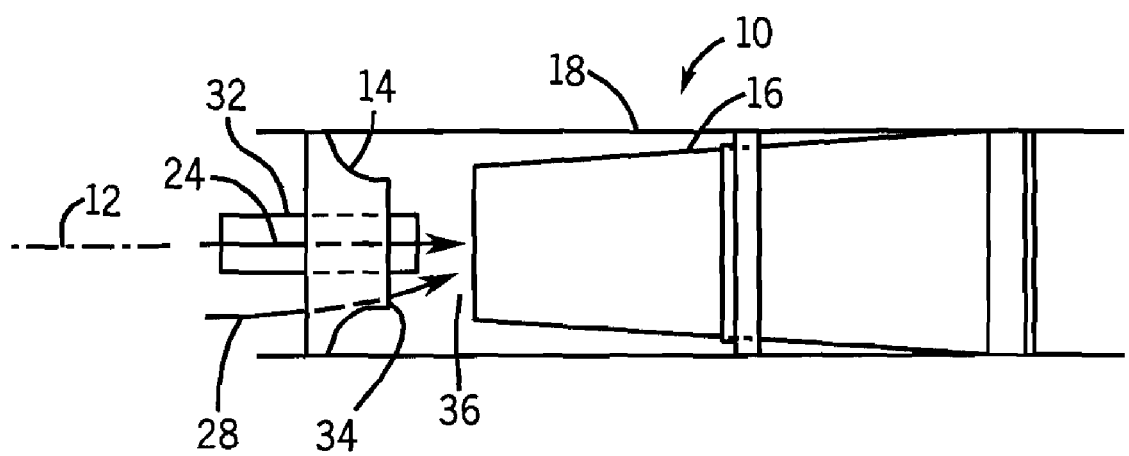
FIG. 1 is a side schematic view illustrating an aspirator in accordance with the invention.

FIG. 1 shows an aspirator 10 directing flow axially from upstream to downstream, e.g. left to right in FIG. 1 along axis 12. The aspirator includes a converging cone 14 accelerating flow therethrough to create a Venturi effect vacuum, and a diverging cone 16 downstream of converging cone 14 and expanding and decelerating flow therethrough. A singular support tube 18 concentrically surrounds and mounts both the converging cone 14 and the diverging cone 16 and both: a) maintains a predetermined axial spacing of the converging and diverging cones 14 and 16 by a single mounting member, namely the singular support tube 18; and b) maintains a predetermined axial alignment of the converging and diverging cones 14 and 16 by the same single mounting member, namely the singular support tube 18.

Figure 2:
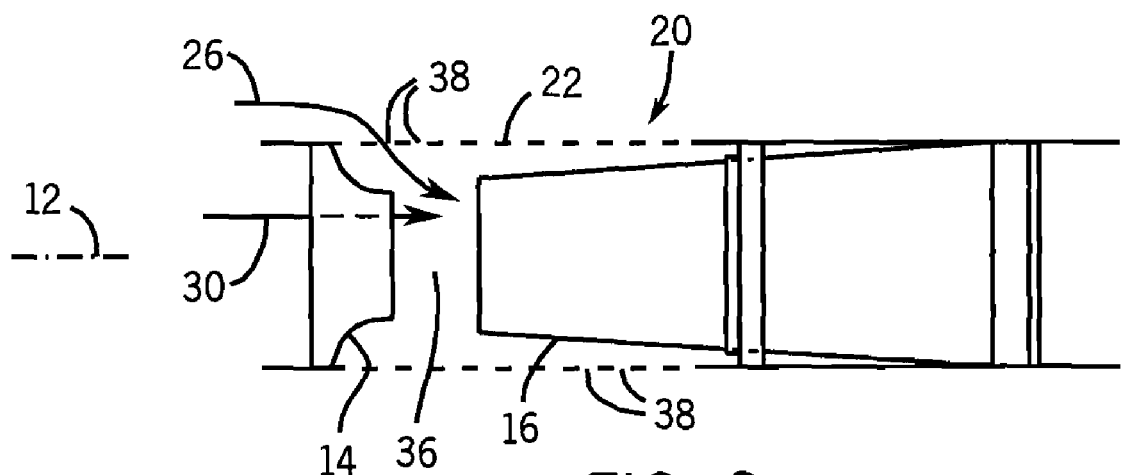
FIG. 2 is like FIG. 1 and shows another embodiment.

FIG. 2 shows an aspirator 20 and uses like reference numerals from above where appropriate to facilitate understanding. Aspirator 20 directs flow axially from upstream to downstream, e.g. left to right along axis 12. Aspirator 20 includes converging cone 14 accelerating flow therethrough to create Venturi effect vacuum, and diverging cone 16 downstream of converging cone 14 and expanding and decelerating flow therethrough. A singular support tube 22 concentrically surrounds and mounts both converging cone 14 and diverging cone 16 and both: a) maintains a predetermined axial spacing of the converging and diverging cones 14 and 16 by a single mounting member, namely the singular support tube 22; and b) maintains a predetermined axial alignment of the converging and diverging cones 14 and 16 by the same single mounting member, namely the singular support tube 22.

Each of the aspirators 10 and 20 of FIGS. 1 and 2, respectively, mixes a secondary flow, e.g. 24 and 26, respectively, with a respective primary flow 28 and 30 for combined flow through the diverging cone 16. One of the primary and secondary flows flows axially through the converging cone, and the other of the primary and secondary flows joins the one flow upstream of the diverging cone 16, and the noted other flow has at least a partial radial inward flow component prior to joining the noted one flow. For example, in FIG. 1 a central inlet tube 32 is provided and is concentrically surrounded by converging cone 14 and is spaced radially inwardly thereof by an annular gap 34, wherein: secondary flow 24 flows through central inlet tube 32; primary flow 28 flows through annular gap 34; and the primary flow 28 is accelerated by converging cone 14 and provides the noted Venturi effect vacuum suctioning secondary flow 24 from central inlet tube 32 in aspiration zone 36. In another example, FIG. 2, support tube 22 is perforated at perforations such as 38, and wherein: secondary flow 26 flows through perforations 38 of support tube 22 into aspiration zone 36 internally of support tube 22 upstream of diverging cone 16; primary flow 30 flows through converging cone 14 into aspiration zone 36; and primary flow 30 is accelerated by converging cone 14 and provides the noted Venturi effect vacuum suctioning secondary flow 26 at aspiration zone 36, FIGS. 2, 3.

Figure 3:
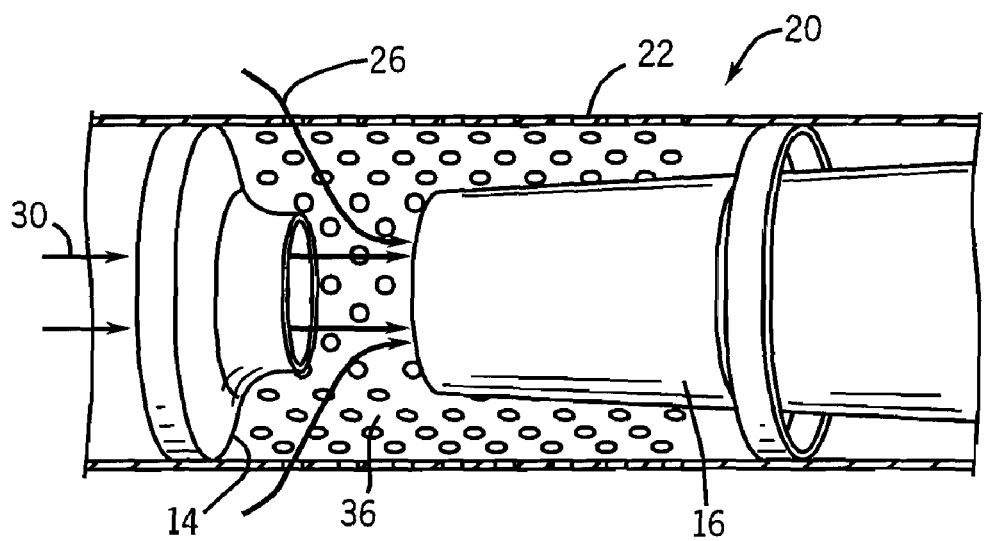
FIG. 3 is a perspective view of the construction of FIG. 2.
Figure 4:
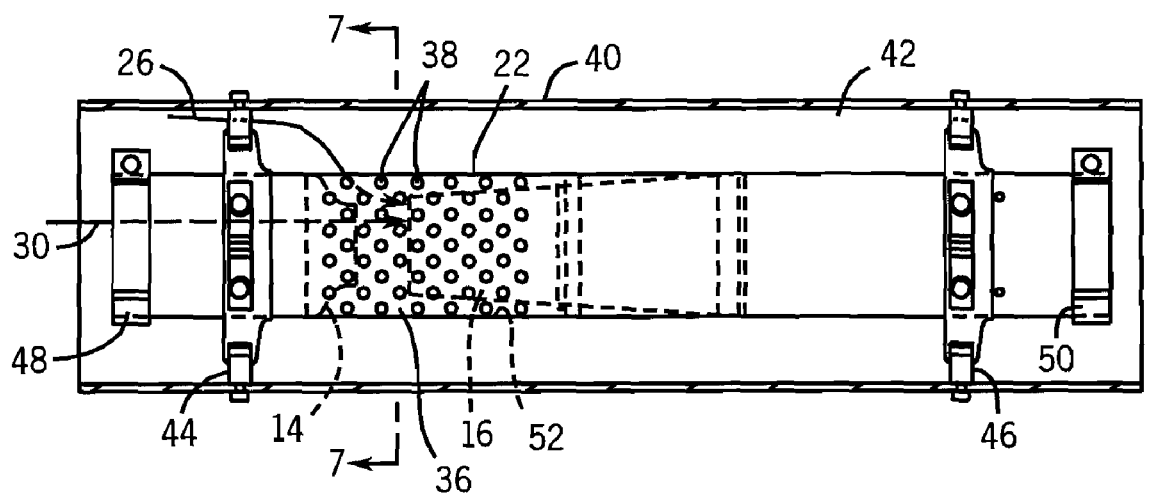
FIG. 4 is a sectional view like FIG. 2 and illustrating a further embodiment.
Figure 5:
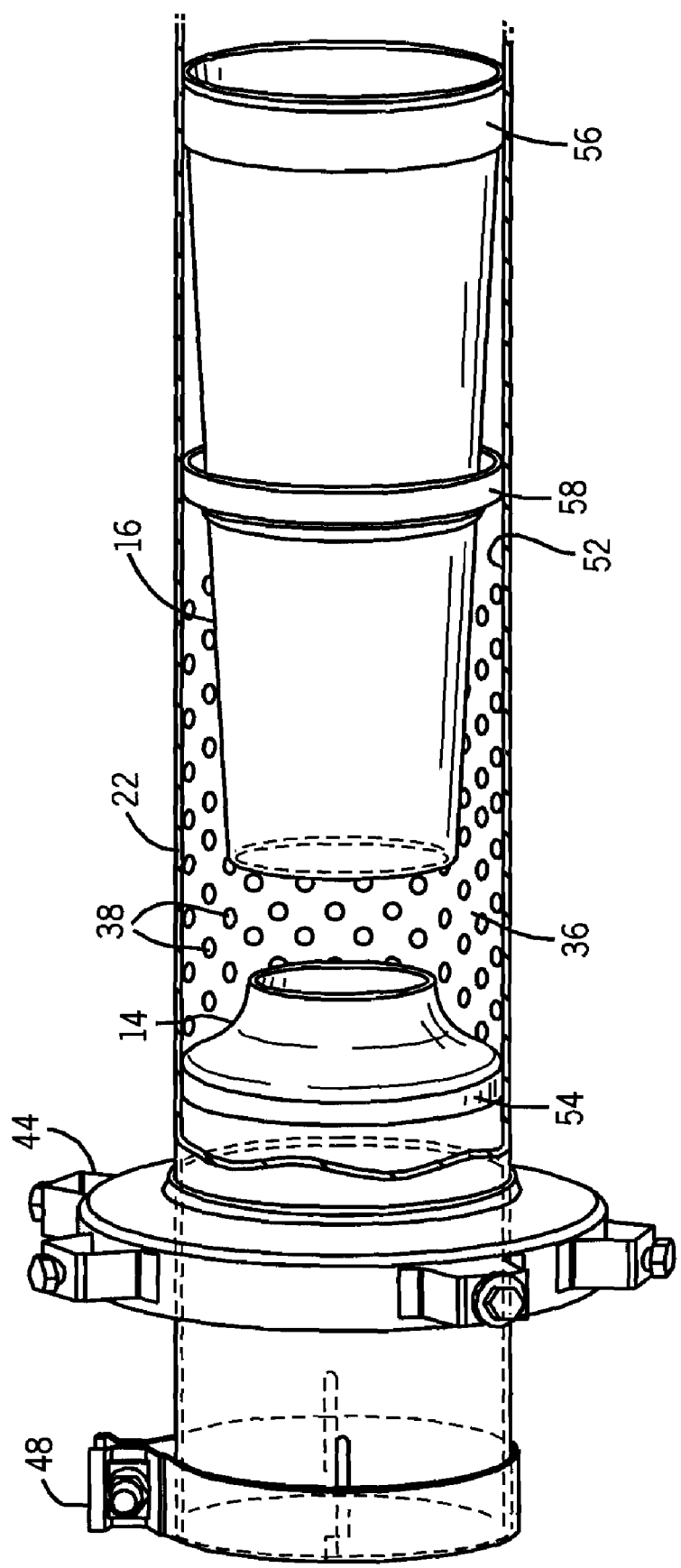
FIG. 5 is a perspective view of a portion of the structure of FIG. 4.
Figure 6:
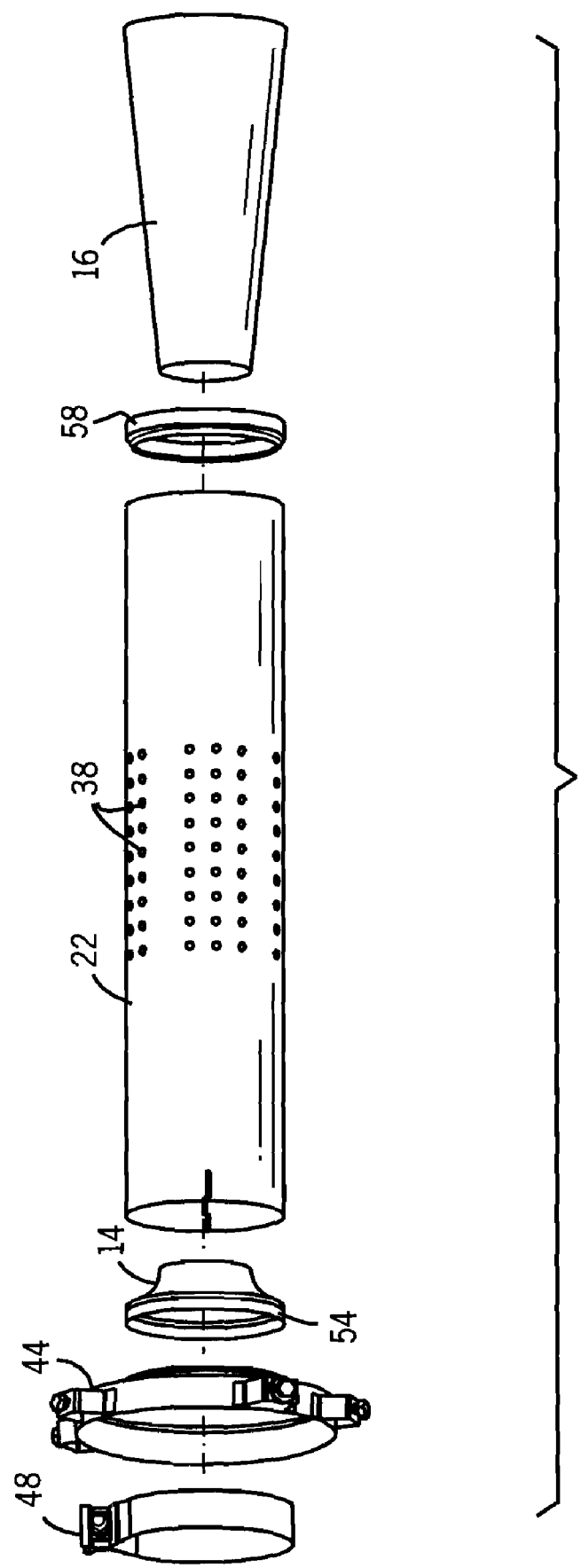
FIG. 6 is an exploded perspective view of the structure of FIG. 5.
Figure 7:
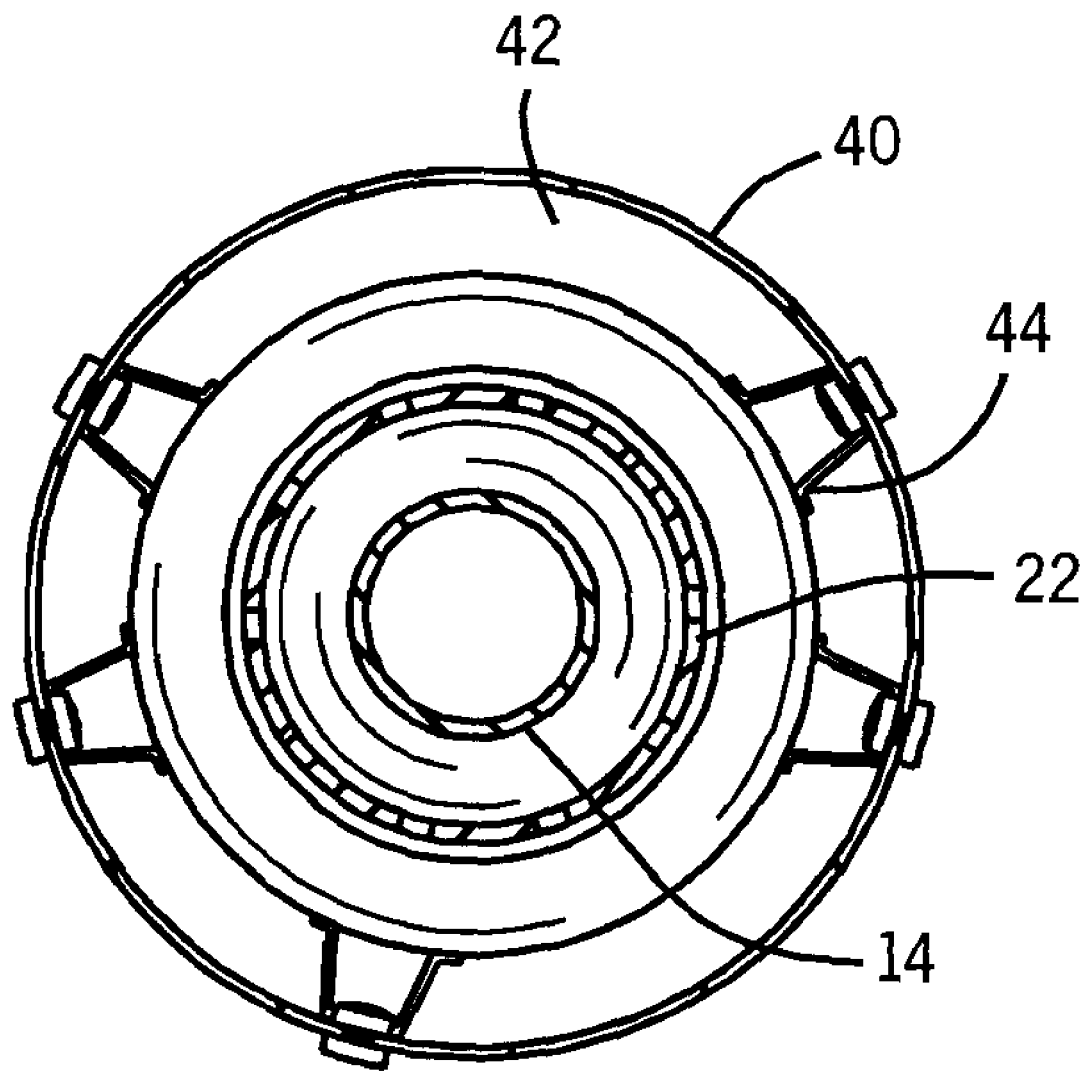
FIG. 7 is a sectional view taken along line 7-7 of FIG. 4.

FIG. 4 uses like reference numerals from FIGS. 2 and 3, and illustrates a further embodiment. Singular support tube 22 is a first tube. A second tube 40 concentrically surrounds and is spaced radially outwardly of first tube 22 by a radial gap 42. A plurality of supports such as a first set of one or more supports 44 and a second set of one or more supports 46, FIGS. 4-7, extend across radial gap 42 and mount second tube 40 to first tube 22. Secondary flow 26 flows axially in radial gap 42 and then radially through perforations 38. In the preferred embodiment, primary flow 30 is accelerated flow and comprises a first fluid, and secondary flow 26 is aspirated flow and comprises a second fluid different than the noted first fluid. In a further preferred embodiment, the primary flow is exhaust flow, e.g. from an internal combustion engine, and secondary flow 30 is ambient air flow. In the latter embodiment, the noted second tube 40 is a heat shield mounted at the noted mounting supports 44, 46 to the noted first tube 22. Tube 22 is mounted in the engine's exhaust system at clamps 48 and 50. Tube 22 is perforated as shown at 38 and defines aspiration zone 36 radially inwardly thereof. Each of converging cone 14 and diverging cone 16 is mounted internally of and solely by perforated tube 22.

In the embodiments of FIGS. 2-7, tube 22 provides perforated support structure supporting the converging and diverging cones 14 and 16 and providing aspirated flow 26 through the perforations 38 of such structure and joining the accelerated flow 30 and passing the combined flow through diverging cone 16. The aspirated flow performs both: suctioned cleaning of a given zone, e.g. 42, external of perforated support structure 22; and cooling of accelerated flow 30. In the preferred embodiment, the perforated support structure is provided by an axially extending perforated tube 22 concentrically surrounding and mounting both the converging cone 14 and the diverging cone 16 and maintaining a predetermined axial spacing and alignment of the converging and diverging cones 14 and 16. Perforated tube 22 defines aspiration zone 36 radially inwardly thereof, and each of converging cone 14 and diverging cone 16 is mounted internally of and solely by perforated tube 22. Further in the preferred embodiment, singular perforated support tube 22 concentrically surrounds and mounts both the converging cone 14 and the diverging cone 16 and satisfies all of the following: a)

maintaining a predetermined axially spacing of the converging and diverging cones 14 and 16 by a single mounting member, namely the singular perforated support tube 22; b) maintaining a predetermined axial alignment of the converging and diverging cones 14 and 16 by the same single mounting member, namely singular perforated support tube 22; and c) providing aspirated flow 26 through the perforations 38 of the singular perforated support tube 22 into an aspiration zone 36 radially inwardly of the singular perforated support tube 22 and joining the accelerated flow 30 and passing the combined flow through the diverging cone 16.

In the preferred manufacturing method, a first of the cones 14 and 16 is pushed axially into support tube 22, and then the second of the cones 14 and 16 is pushed into support tube 22 to a predetermined axial spacing from the first cone. Support tube 22 has an inner surface 52 defining the noted aspiration zone 36. Cones 14 and 16 are secured to inner surface 52 of support tube 22, e.g. by welding. Each of cones 14 and 16 is preferably supported solely by inner surface 52 of support tube 22, which provides manufacturing efficiency. Cone 14 has an outer flange 54 welded to inner surface 52. Cone 16 has an outer flange 56 welded to inner surface 52. Additionally, a guide flange 58 may be initially welded to inner surface 52, followed by insertion of cone 16, axially leftwardly in the orientation of FIGS. 2-7, followed by welding of flange 56 to inner surface 52. Flanges 58 and 56 provide axially spaced two-point support of axially extended cone 16.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for making an aspirator directing flow axially from upstream to downstream, said aspirator having a converging cone accelerating flow therethrough to create Venturi effect vacuum, and a diverging cone downstream of said converging cone and expanding and decelerating flow therethrough, said method comprising:
   providing an axially extending support tube;
   pushing a first of said cones axially into said support tube;
   pushing a second of said cones into said support tube to a predetermined axial spacing from said first cone,
   wherein said support tube has an inner surface defining an aspiration zone, and comprising securing said first and second cones to said inner surface of said support tube,
   supporting said first cone solely by said inner surface of said support tube;
   supporting said second cone solely by said inner surface of said support tube,
   providing one of said cones with an outer first flange;
   securing said first flange to said inner surface of said support tube;
   providing the other of said cones with an outer second flange;
   securing said second flange to said inner surface of said support tube;
   providing said other cone as an axially extended member;
   providing a third flange secured to said inner surface of said support tube and axially spaced from said second flange and guiding and supporting said other cone including at axially spaced two-point engagement,
   using said first flange to support said converging cone, and not said diverging cone;
   using said second flange to support said diverging cone, and not said converging cone;
   securing said third flange to said inner surface of said support tube prior to securing said second flange to said inner surface of said support tube, wherein said third flange provides said guiding of said other cone during said pushing of said other cone into said support tube.

2. A method for making an aspirator directing flow axially from upstream to downstream, said aspirator having a converging cone accelerating flow therethrough to create Venturi effect vacuum, and a diverging cone downstream of said converging cone and expanding and decelerating flow therethrough, said method comprising:
   providing an axially extending support tube;
   pushing a first of said cones axially into said support tube;
   pushing a second of said cones into said support tube to a predetermined axial spacing from said first cone,
   wherein said support tube has an inner surface defining an aspiration zone, and comprising securing said first and second cones to said inner surface of said support tube,
   supporting said first cone solely by said inner surface of said support tube;
   supporting said second cone solely by said inner surface of said support tube,
   providing one of said cones with an outer first flange;
   securing said first flange to said inner surface of said support tube;
   providing the other of said cones with an outer second flange;
   securing said second flange to said inner surface of said support tube;
   providing said other cone as an axially extended member;
   providing a third flange secured to said inner surface of said support tube and axially spaced from said second flange and guiding and supporting said other cone including at axially spaced two-point engagement,
   using said first flange to support said converging cone;
   using said second flange to support said diverging cone;
   securing said third flange to said inner surface of said support tube prior to securing said second flange to said inner surface of said support tube, wherein said third flange provides said guiding of said other cone during said pushing of said other cone into said support tube.

* * * * *